(12) United States Patent
Jaradi et al.

(10) Patent No.: US 10,155,495 B2
(45) Date of Patent: Dec. 18, 2018

(54) SIDE AND SEAT-BACK AIRBAG

(71) Applicant: Ford Global Technologies, LLC, Dearborn, MI (US)

(72) Inventors: Dean M. Jaradi, Macomb, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 632 days.

(21) Appl. No.: 14/319,059

(22) Filed: Jun. 30, 2014

(65) Prior Publication Data

US 2015/0375706 A1 Dec. 31, 2015

(51) Int. Cl.
*B60R 21/207* (2006.01)
*B60R 21/231* (2011.01)

(52) U.S. Cl.
CPC .......... *B60R 21/207* (2013.01); *B60R 21/231* (2013.01); *B60R 2021/23153* (2013.01)

(58) Field of Classification Search
CPC .......... B60R 2021/23153; B60R 2021/23146; B60R 2021/2078; B60R 21/23138; B60R 21/207
See application file for complete search history.

(56) References Cited

U.S. PATENT DOCUMENTS

| | | | | |
|---|---|---|---|---|
| 3,779,577 A | * | 12/1973 | Wilfert | 280/730.1 |
| 4,565,535 A | * | 1/1986 | Tassy | 441/118 |
| 5,251,931 A | * | 10/1993 | Semchena et al. | 280/730.1 |
| 5,499,840 A | * | 3/1996 | Nakano | 280/730.1 |
| 5,782,529 A | * | 7/1998 | Miller et al. | 297/216.13 |
| 5,902,010 A | * | 5/1999 | Cuevas | 297/216.13 |
| 6,142,508 A | * | 11/2000 | Lewis | 280/730.2 |
| 7,669,888 B2 | * | 3/2010 | Sato et al. | 280/730.2 |
| 8,534,700 B2 | | 9/2013 | Rick | |
| 8,690,187 B2 | * | 4/2014 | Fukawatase | 280/730.2 |
| 8,702,123 B2 | * | 4/2014 | Mazanek et al. | 280/730.2 |
| 2010/0140909 A1 | * | 6/2010 | Jang | 280/743.1 |
| 2012/0049493 A1 | * | 3/2012 | Lee | 280/730.2 |
| 2013/0093224 A1 | * | 4/2013 | Dainese et al. | 297/216.12 |

FOREIGN PATENT DOCUMENTS

| | | | |
|---|---|---|---|
| DE | 4334896 A1 | * | 4/1995 |
| DE | 10106238 A1 | | 9/2002 |
| DE | 10201836 A1 | | 8/2003 |
| JP | 2000511489 A | | 9/2000 |
| JP | 2010052621 A | | 3/2010 |
| KR | 20130054244 A | | 5/2013 |
| WO | WO 0021797 A1 | * | 4/2000 |
| WO | WO 2004050435 A1 | * | 6/2004 |

OTHER PUBLICATIONS

Notification of First Office Action issued by State Intellectual Property Office of the People's Republic of China dated May 24, 2018 regarding Application No. 201510386969.1 (3 pages).

* cited by examiner

*Primary Examiner* — James A English
(74) *Attorney, Agent, or Firm* — Frank A. MacKenzie; Bejin Bieneman PLC

(57) ABSTRACT

An airbag has a main panel and at least one side panels that is arranged to extend substantially perpendicularly from the main panel when the airbag is inflated. At least one inflator is arranged to inflate all of the panels. The airbag, e.g., via the main panel, may be secured to a back of a vehicle seat.

9 Claims, 3 Drawing Sheets

SIDE AND SEAT-BACK AIRBAG

BACKGROUND

In cases where a vehicle experiences a frontal impact, and occupant of a rear seat very often is thrown into a seat-back of a front-row seat. Rear-seat vehicle occupants may increase the risk of serious injury from such events, such as serious head, neck, and leg injuries. In side or oblique impacts, in contrast, front-seat passengers may be thrown toward a side of the vehicle, e.g., a door and/or window, or toward another passenger seat. Additional restraint systems such as airbags to protect against both of the foregoing kinds of impact add cost, weight, and complexity to a vehicle design and manufacture.

DRAWINGS

Figure 1:
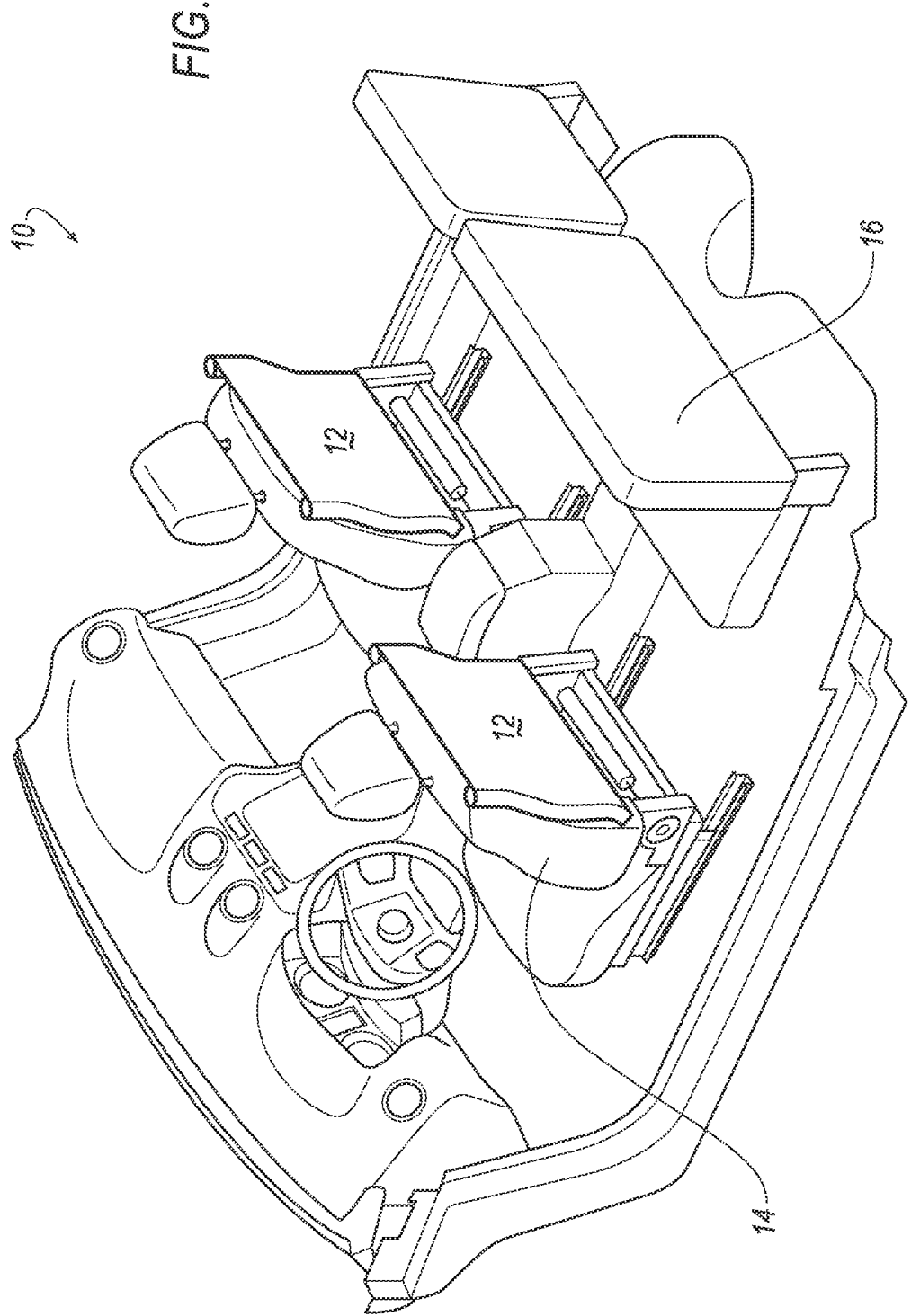

FIG. 1 is a perspective view of a portion of a vehicle interior including seat-mounted restraint system in an undeployed state.

Figure 2:
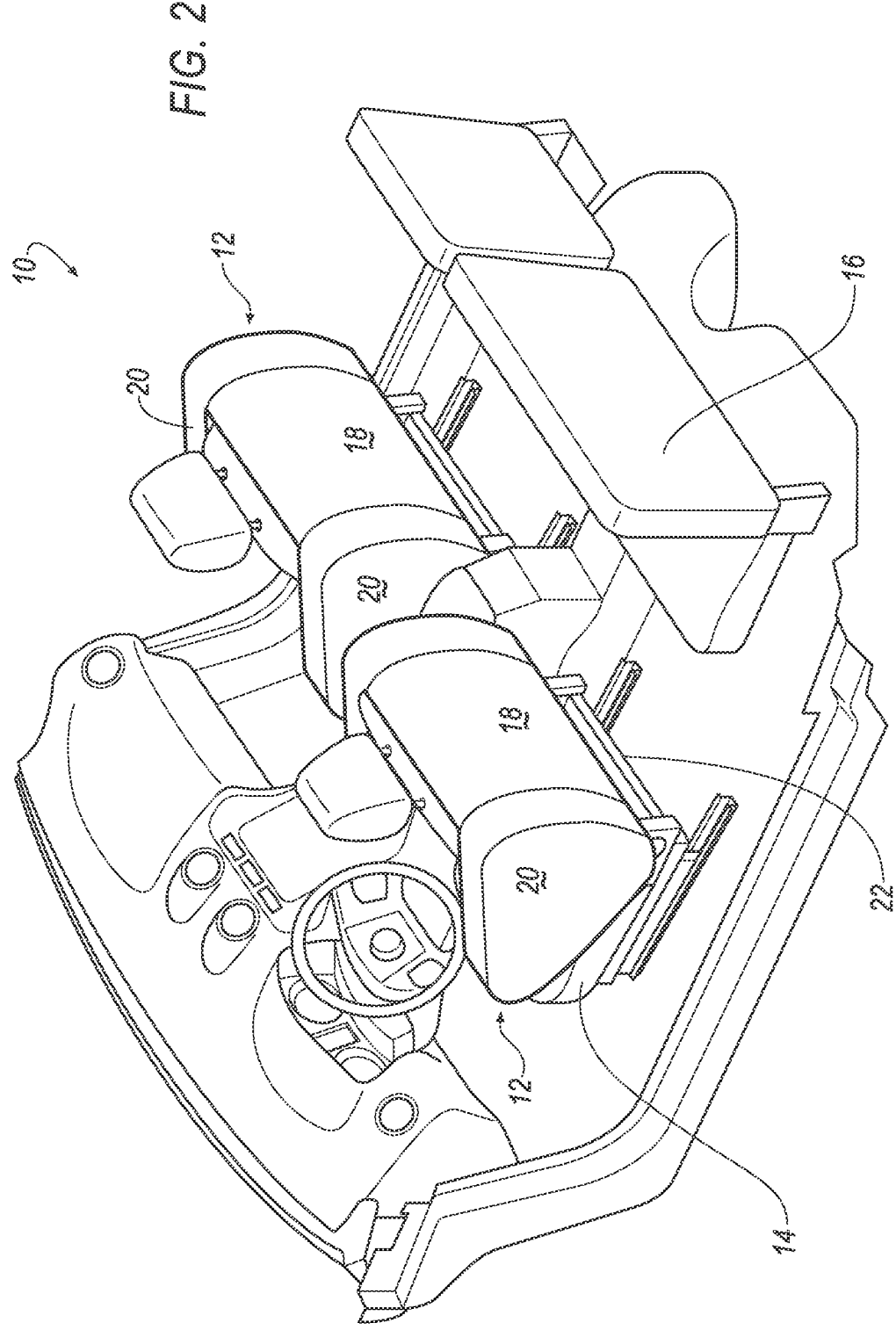

FIG. 2. is a perspective view of a portion of a vehicle interior including seat-mounted restraint system in a deployed state.

Figure 3:
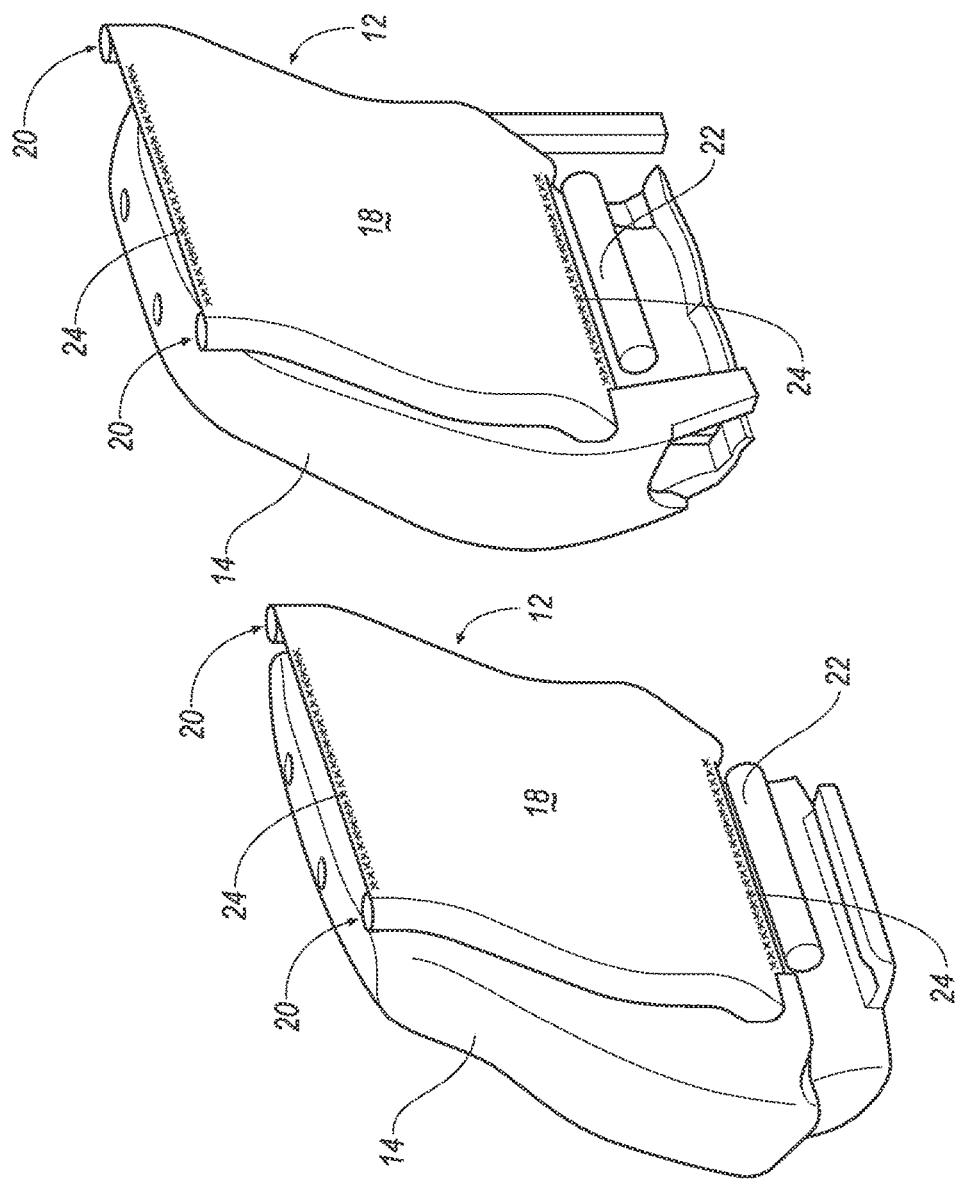

FIG. 3 is a perspective view of a vehicle seat-back having affixed thereto a seat-mounted restraint system.

DETAILED DESCRIPTION

Disclosed herein and illustrated in the various figures is a restraint system, e.g., an airbag, 12 installed on a back side of a vehicle front-seat 14. FIGS. 1 and 2 provide perspective views of a portion of a vehicle interior 10 including seat-mounted airbags 12 in undeployed and deployed states, respectively. When a collision detection system in a vehicle, such as is known, detects an impact, an airbag controller or the like in the vehicle may trigger an inflator 22 (best seen in FIG. 3) to inflate, and thereby deploy, the airbag 12 as shown in FIG. 2. For example, when deployed, the airbag 12 includes a main panel 18, and at least one side panel 20, e.g., as seen in FIG. 2, each airbag 12 may include two side panels 20 extending substantially perpendicularly from the main panel 18. The airbag 12, including the panels 18, 20, is generally constructed in a conventional manner, e.g., sheets of a known fabric, generally having no or little elasticity, may be stitched together, covered with a sealant or the like, etc.

As also seen in FIG. 2, the side panels 20 may extend forward, i.e., toward a front of a vehicle interior 10, from the main panel 18. However, other configurations of side panels 20 are possible, e.g., extending rearward in a vehicle interior with respect to a back of the vehicle seat 14 and the main panel 18, extending forward and rearward, etc. Moreover, the side panels 20 are shown in the figures as having a generally triangular shape, while the main panel 18 has a generally rectangular shape, but other shapes for the panels 18, 20 are possible, e.g., as may be warranted based on a particular type of vehicle and/or configuration of a vehicle interior 10.

FIG. 3 illustrates certain details of mounting an undeployed airbag 12 to a seat 14. As mentioned above, FIG. 3 shows an inflator 22 at a base of a backside of the seat 14, although the inflator 22 could be located at elsewhere, e.g., a side of, under, etc., the seat 14. An airbag controller such as is known may be used to send a signal to an igniter or the like to trigger the inflator 22, which may then provide gas to inflate the airbag 12 in a known manner. Because the airbag 12 generally includes a single chamber, a single inflator 22 may typically be used to inflate the main panel 18 and one or more side panels 20.

A securing mechanism such as stitching 24 is generally used to secure the airbag 12 to the seat 14. In the illustrated example, the main panel 18, but not the side panels 20, is secured to the seat 14; the side panels 20 are rolled up and disposed along sides of the seat 14. For example, as seen in FIG. 3, stitching 24 may be provided substantially horizontally along a base of the main panel 18 of the airbag 12, and substantially horizontally along a top edge of the main panel 18, e.g., at or near a top edge of a back of the seat 14. Further, when the airbag 12 is installed in an undeployed state, the side panels 20 may be folded, or, as shown in FIG. 3, rolled. Moreover, in the illustrated example, inflation of the airbag 12 causes the side panels 22 to unroll and, when fully inflated, assume the deployed state illustrated in FIG. 2. The main panel 18, in contrast, is generally not folded or rolled, but is installed on the back of the seat 14 such that sheets of fabric making up the main panel 18 are disposed in a generally flat or sheet-like manner against the back of the seat 14, e.g., as best seen in FIG. 3.

Accordingly, deployments of an airbag 12 may occur according to a process initiated when a controller detects a collision or likely collision, and sends a signal to the inflator 22 to inflate the airbag 12. The panels 18, 20 of the airbag 12 then inflate, whereby the airbag 12 reaches a deployed state, e.g., as seen in FIG. 2. It should be understood that the airbag 12, when installed on a back of a seat 14, may be provided with a conventional covering, e.g., a fabric or the like, that may be configured to expand and/or tear as the airbag 12 is deployed. For example, the side panels 20 could be confined by a cover or the like, where the cover was stretched and/or torn upon inflation of the airbag 12.

As mentioned above, an airbag controller such as is known may be used to initiate deployment of the airbag 12. In general, such an airbag controller may include a processor and a memory or other computer-readable medium storing instructions executable by the processor, including instructions for determining when and how to deploy an airbag 12 as disclosed herein. Sensors various sensors in a vehicle may collect and provide to the controller various data, e.g., via a controller area network (CAN) bus or some other networking technology in a vehicle. Based on evaluations of the data, e.g., according to known algorithms, the controller may trigger deployment of an airbag 12, e.g., upon detection of a collision. For example, the airbag 12 may be deployed by the controller causing an igniter or the like to be triggered, which in turn causes an inflator 22 to provide the PAB 10 with gas, thereby inflating the airbag 12.

As used herein, the adverb "substantially" modifying an adjective means that a shape, structure, measurement, etc. may deviate from an exact described geometry, distance, measurement, etc., because of imperfections in materials, machining, manufacturing, etc.

In the drawings, the same reference numbers indicate the same elements. Further, some or all of these elements could be changed. Accordingly, it is to be understood that the above description is intended to be illustrative and not restrictive. For example, the vehicle interior 10 of FIGS. 1 and 2 includes an airbag 12 on each of two front vehicle seats 14, although it is possible that only one of the seats 14 could have an airbag 12 installed thereon. Likewise, as mentioned above, panels 18, 20 could be of different shapes then illustrated herein and/or could extend in directions as an alternative or in addition to what is presently illustrated. Further, although in the example discussed above, the panels 18, 20 form a single-chambered airbag 12, as an alternative the panel 18 could be constructed of a foam or the like, and affixed to a back of a seat 14 to protect a rear-seat passenger in the event of a frontal impact. The inflator 22 could then be configured to inflate two side panels 20, which in this alternative example could be separate airbags.

Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. An airbag system, comprising:
   an airbag having a main panel and two side panels, each of the side panels arranged to extend substantially perpendicularly from the main panel when the airbag is inflated; and
   at least one inflator that is arranged to inflate all of the panels;
   wherein the main panel of the airbag is stitched to a back of the vehicle seat.

2. The apparatus of claim 1, wherein the side panels are not secured to the back of the vehicle seat.

3. The apparatus of claim 1, wherein the side panels are rolled and disposed along the respective sides of the vehicle seat.

4. The apparatus of claim 1, wherein the side panels extend in a forward direction with respect to a vehicle interior when the airbag is inflated.

5. A restraint system for a vehicle, comprising:
   a vehicle seat;
   an airbag secured to a back side of the vehicle seat, the airbag having a main panel and at least one side panel arranged to extend substantially perpendicularly from the main panel when the airbag is inflated; and
   at least one inflator that is arranged to inflate all the panels;
   wherein the main panel of the airbag is stitched to a back of the vehicle seat.

6. The restraint system of claim 5, wherein the at least one side panel is not secured to the back of the vehicle seat.

7. The restraint system of claim 5, wherein the at least one side panel is rolled and disposed along the respective sides of the vehicle seat.

8. The restraint system of claim 5, wherein the at least one side panel extends in a forward direction with respect to a vehicle interior when the airbag is inflated.

9. The restraint system of claim 5, further comprising a controller that is programmed to signal the inflator to inflate the airbag.

* * * * *